W. J. PHELPS.
PROCESS OF PROVIDING CAN CAPS WITH SOLDER HEMS.
APPLICATION FILED OCT. 9, 1911.
1,188,314.
Patented June 20, 1916.
4 SHEETS—SHEET 3.
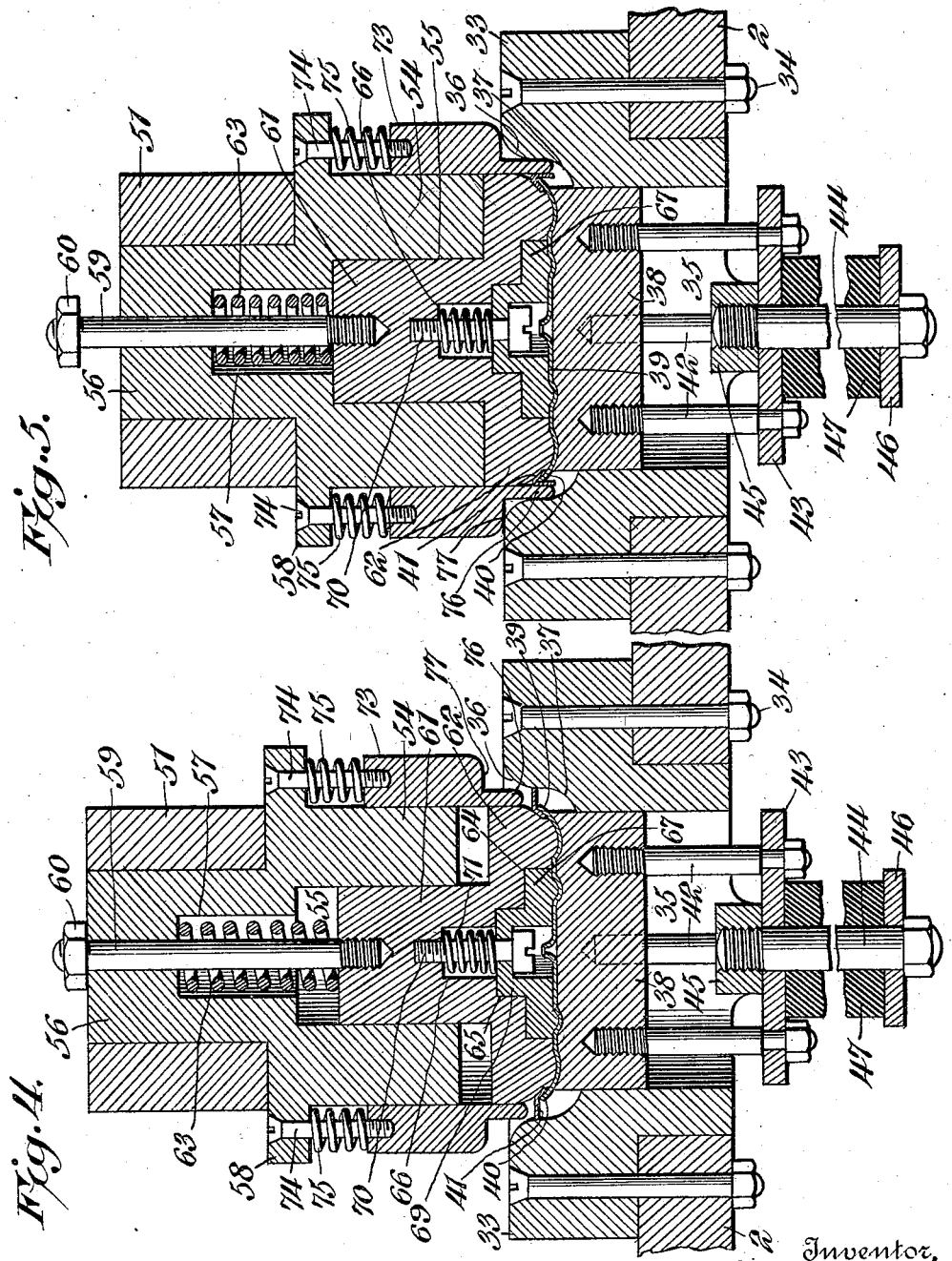
Witnesses
Howard D. Orr.
F. T. Chapman.
Attorney

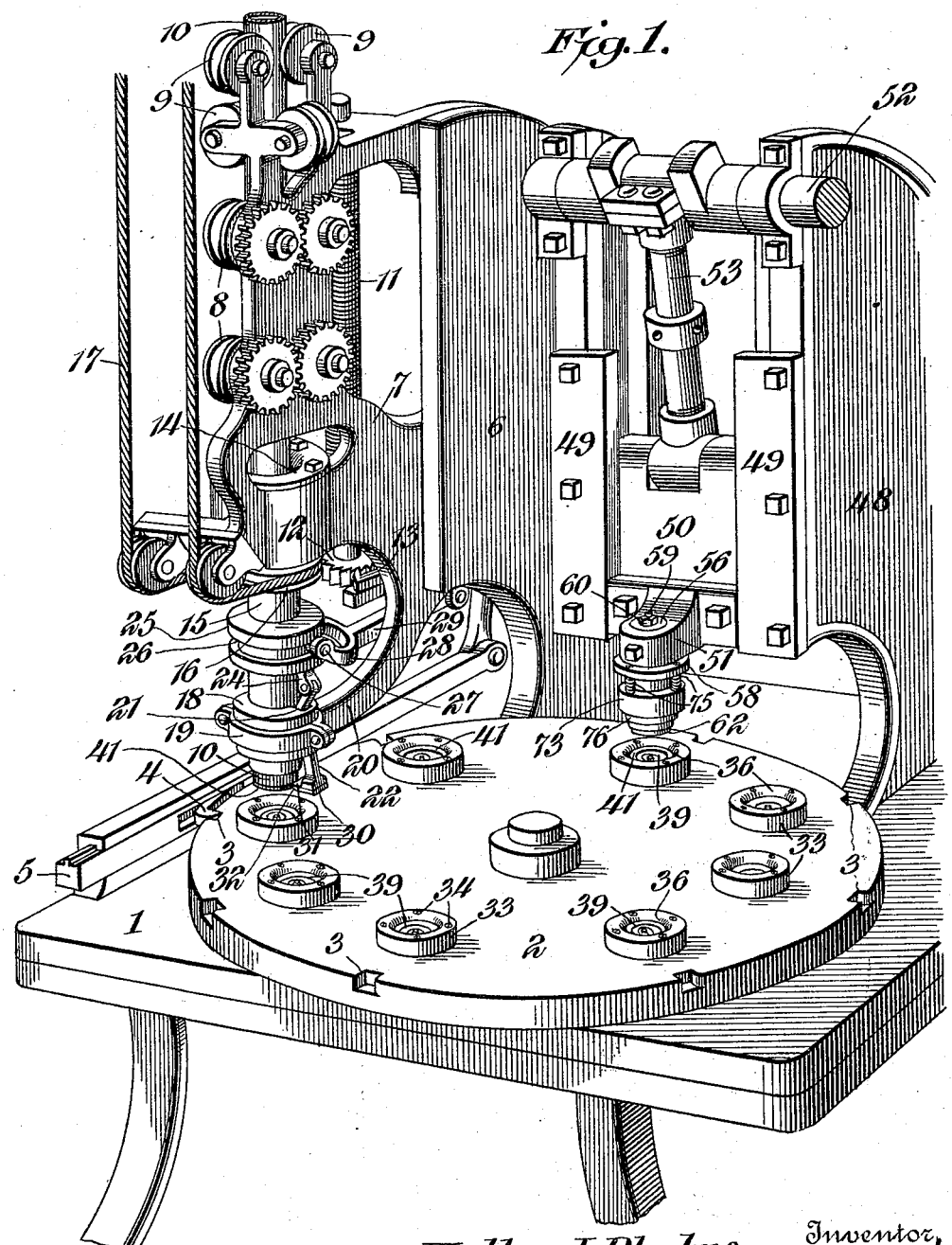

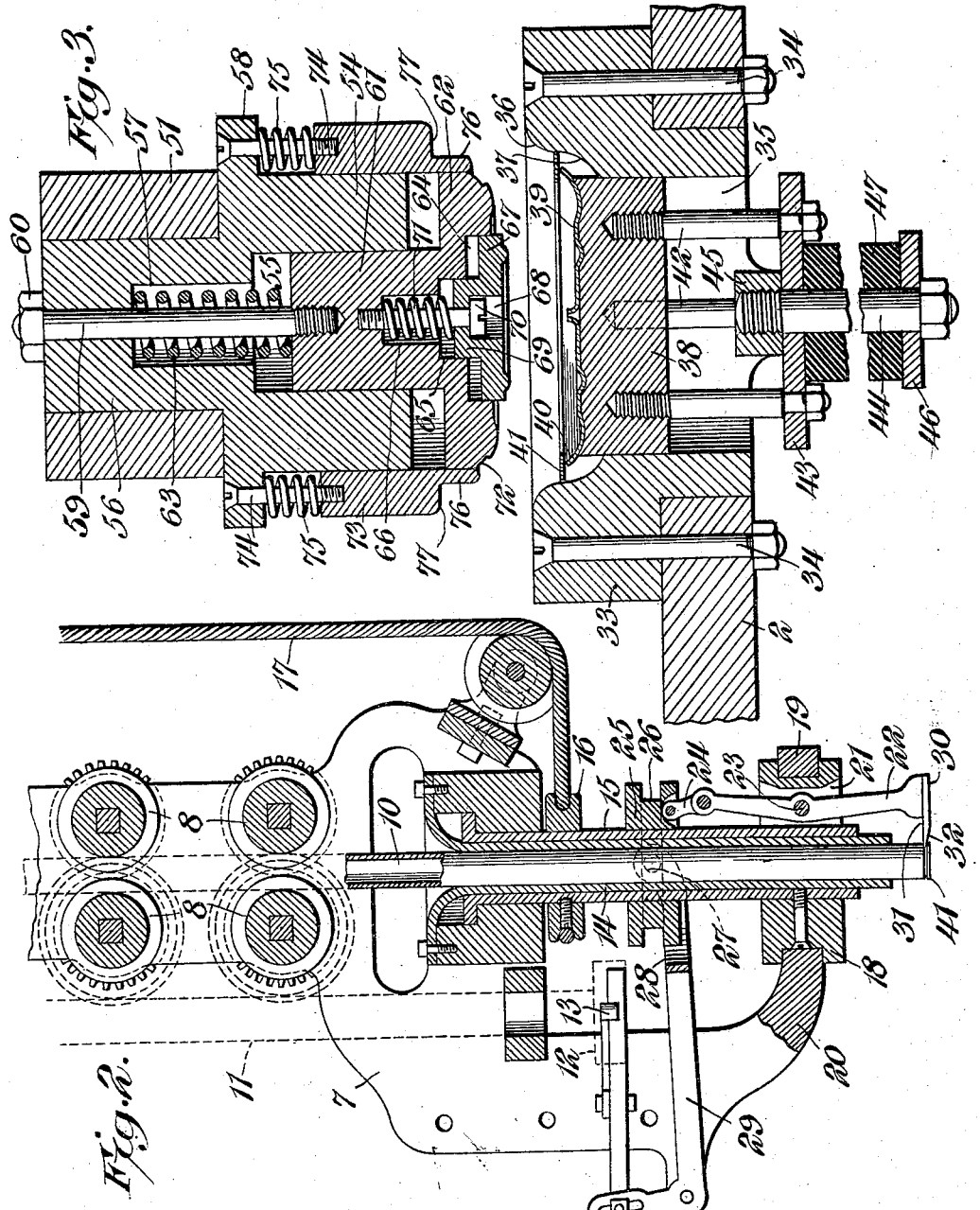

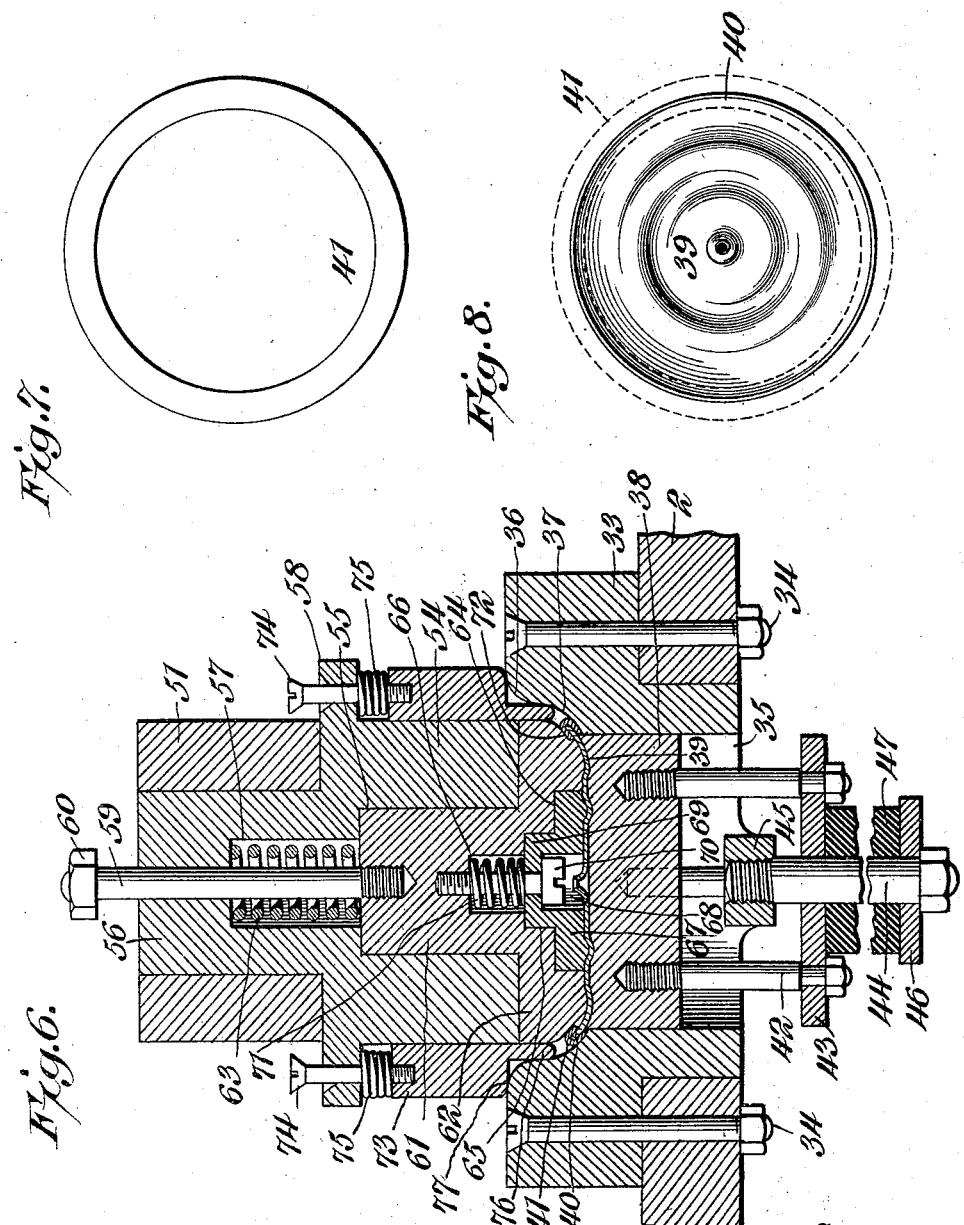

UNITED STATES PATENT OFFICE.

WALTER J. PHELPS, OF BALTIMORE, MARYLAND.

PROCESS OF PROVIDING CAN-CAPS WITH SOLDER HEMS.

1,188,314.  Specification of Letters Patent.  Patented June 20, 1916.

Application filed October 9, 1911. Serial No. 653,629.

*To all whom it may concern:*

Be it known that I, WALTER J. PHELPS, a citizen of the United States, residing at Baltimore, State of Maryland, have invented a new and useful Process of Providing Can-Caps with Solder Hems, of which the following is a specification.

This invention has reference to improvements in the process of providing can caps with solder hems, and its object is to expeditiously produce solder rings without waste, and to apply them to the edges of can caps in such manner that when the can cap is applied to the top of a can and is subjected to the action of a soldering tool, the solder will flow evenly, producing a uniformly tight joint, while the expenditure of solder for the purpose approaches an irreducible minimum.

In practising the present invention solder is first provided in the form of a tube of requisite diameter, the outside diameter of the tube being greater than the diameter of the can cap, and the inside diameter of the tube being less than the diameter of the can cap. Such a tube is fed longitudinally step by step, and thin, waferlike rings of solder are cut from the advancing end of the tube while the tube is substantially vertical with the end from which the rings are being cut lowermost, wherefore the rings will fall as cut, ultimately resting upon the upturned edges of the can caps presented in succession underneath the solder tube, the can caps having a marginal flange preferably progressively curved in one direction away from the general plane of the cap.

The solder rings are very delicate and would inevitably be injured if handled, for which reason the rings as cut are caused to gravitate upon the inverted can caps already lodged on supports, and then each ring so placed is subjected to the action of a suitable die or plunger so shaped and timed in operation that the can cap with the thin solder ring lodged thereon is first clamped in position and at the next instant that portion of the solder ring within the area of the can cap is forced against the concave face of the marginal flange of the can cap, immediately after which the outer portion of the solder ring is forced around the edge of the can cap into substantially concentric relation with the center of the can cap, the said can cap being round. By a progressive movement of the parts that portion of the solder ring which has been formed into cylindrical shape is next brough into engagement with a suitably shaped former, which forces the thin cylindrical portion of the solder ring toward the center of the cap and against the convex face of the marginal flange of the cap. After this the parts return to their original position and the can cap with the solder hem thereon is removed to be replaced by another cap to which the solder hem is to be applied.

Because of the manner of producing the solder rings they may be made very thin and in practice need not exceed seventeen-one-thousandths of an inch in thickness and may be even thinner. To cut the ring the solder tube is advanced a distance equal to the thickness of the ring and then there is a cutter applied to the tube, and this cutter is moved progressively toward the longitudinal axis of the tube, while at the same time there is established a relative rotative movement between the cutter and the tube, this movement being brought about either by revolving the knife about the tube as the knife is moved toward the axis of the tube, or by rotating the tube about its own axis as the knife is moved toward the axis of the tube. It is preferable, however, to revolve the knife about the tube simultaneously with its radial movement, so that the knife moves in a spiral path of gradually reducing radius during the cutting operation and may travel in a like path, but in the reverse direction radially during the retractive movement of the knife or cutter.

The rings produced are of practically even thickness throughout and substantially flat and the cutter employed is in the form of a knife with an edge beveled on one side only, and with the flat portion presented toward the end of the tube from which the ring is cut, the travel of the knife being such that the body of the knife never presses against the freshly cut end of the tube, for such pressure would result in upsetting the metal of the tube at the end from which the next successive ring is to be cut, whereby uniformity of the rings would be impossible. By imparting to the knife a high speed of revolution so that it makes several turns about the solder tube before progressing through the walls thereof, the metal of the tube is severed in the form of a wafer-like ring without waste of material, without distortion, and without the formation of a bur, Furthermore, the ring after being cut gravitates through a short distance to the can cap ready to receive it, and is automatically centered thereon without distortion of any kind, and after the operation of pressing the solder ring into the form of a hem embracing the margins of the can cap and extending a short distance along the upper and inner walls of the curved marginal flange of the can cap has been started, it is completed by a continuous progressive movement. There is, therefore, no chance for the solder ring becoming displaced with relation to the can cap after having been once lodged therein in concentric relation to the center of the can cap, so that the finished hem is evenly disposed all about the edge of the can cap, and when the can cap is secured to the can top the amount of solder present is sufficient to thoroughly seal the cap to the can top without any surplus of solder and without some portions of the joint being surcharged with solder.

Can caps provided with solder hems in accordance with the present invention are sealed in place at a material reduction in cost over the heretofore prevailing method of soldering can caps in place, the saving in solder alone being very material where large numbers of can caps are employed.

The invention will be best understood from a consideration of the following detailed description taken in connection with the accompanying drawings forming a part of this specification, which drawings illustrate a practical mechanism by which the process of the present invention may be practised, but it will be understood that the invention may be carried out by the employment of other apparatus.

In the drawings: Figure 1 is a perspective view of so much of a machine as is necessary for the understanding of the present invention. Fig. 2 is a vertical section through the solder ring cutting apparatus drawn to a larger scale than Fig. 1 and omitting some of the parts shown in Fig. 1. Fig. 3 is a vertical central section through a die and follower for applying the solder ring to a can cap, the parts being shown in the initial position. Fig. 4 is a view similar to Fig. 3 but with the parts further advanced in the cycle of operations. Fig. 5 is a view similar to Figs. 3 and 4, but showing the parts still further advanced. Fig. 6 is a view similar to Figs. 3, 4 and 5, but showing the final step in the application of the solder hem to the can cap. Fig. 7 is a plan view of a solder ring. Fig. 8 is an inverted plan view of a can cap with the relative position of a solder ring when resting thereon indicated in dotted lines.

The structure shown in Figs. 1 and 2 in so far as it relates to the production of the solder rings is shown and described in Patent No. 1,005,299, granted to me October 10, 1911, for machine for cutting solder rings and applying the same to the edges of can caps, and hence the following description will refer to the parts without entering particularly into the details of construction. Upon a suitable table or support 1 there is mounted a dial plate 2 provided with a circular series of peripheral notches 3 into which engages a tooth 4 on an actuating slide 5 carried by the table 1, and receiving power in any suitable manner described more in detail in the aforesaid application, whereby there is imparted to the dial 2 a step by step rotative movement. The dial is provided with a circular series of dies to which reference will hereinafter be made. Carried by the table 1 is an upright 6 having an outstanding bracket 7 on which is mounted a series of rollers 8, 9, constituting straightening and feeding rollers for a solder tube 10, certain of the rollers being under the control of a screw rod 11 terminating at one end in a ratchet wheel 12 receiving intermittent motion by means of a reciprocating tooth 13, all as described in the aforesaid application.

The solder tube 10 extends through a sleeve 14 of appropriate length, which sleeve is substantially vertical when the machine is in operation and terminates at an appropriately short distance above the dial 2. The sleeve 14 is made fast to the bracket 7 and, therefore, is stationary. Mounted on the sleeve 14 exterior thereto is a hollow shaft 15 carrying a pulley 16 receiving power through a belt 17, which in turn may be impelled by any suitable mechanism not shown. The upper end of the hollow shaft 15 has a suitable bearing in an appropriate part of the bracket 7 and near the lower end the shaft 15 has secured thereto a circular block 18 embraced by a collar 19 in part formed on a bracket 20 constituting part of the bracket 17, the structure being such that the block 18 may rotate but cannot move in the direction of its longitudinal axis. The block 18 is provided with a passage 21 therethrough in substantially concentric parallel relation with the axis of rotation of the block and adjacent but exterior to the shaft 15. This passage 21 is traversed by a lever 22 held to the block 18 by a pivot pin 23 about intermediate of the length of the passage 21. The lever 22 has one arm of a length to extend below the lower end of the sleeve 14 and the other end of the lever 22 which extends above the block 18 is connected by a toggle link 24 to a rotatable block 25 provided with a circumferential groove 26, the latter being entered by pins 27 on a fork 28 carried by one end of a lever 29, which latter is actuated by means, and in a manner set forth in the aforesaid application to impart movement to the block 25 in the direction of the longitudinal axis of the shaft 15, and this motion is transmitted by the toggle link 24 to the lever 22 in a manner to cause the lower end of this lever to approach and recede from the longitudinal axis of the shaft 15 and sleeve 14, and, therefore, toward and from the longitudinal axis of the solder tube 10 when in position in the sleeve 14. The lower end of the lever 22 carries a cutter 30 in the form of a knife blade with the upper face 31 flat and provided with a bevel 32 on the lower face approaching the upper face toward one edge of the blade 30 to form a cutting edge.

The dial plate 2 is provided with a circular series of passages therethrough near the periphery and in each passage there is mounted an annulus 33 secured to the dial plate by bolts 34 or otherwise. The annulus 33 has a central axial bore 35 concentric with the passage in which the annulus is seated, and at the end of the annulus constituting its upper end in operation, the bore is expanded in the form of a compound curve 36, 37 like an ogee. In the cylindrical portion of the bore 35 there is mounted a die block 38 having what constitutes the upper face shaped to receive a can cap 39 in inverted position, the can cap being shown as provided with a marginal curved flange 40. The die block 38 is shaped to receive the can cap with the marginal flange 40 in part projecting beyond the periphery of the block and extending above the upper surface of the block when the can cap is in place thereon. The expanded portion 36, 37 of the bore 35 is so related to the can cap when in position on the die block that the margin 40 of the can cap may receive a solder ring 41 at about midway of the distance between the outer and inner peripheries of the ring, and the expanded portion 36 and 37 is so related to the ring 41 as to center the latter on the can cap in the position described and best shown in Fig. 3, the outcurved portion 36 guiding the ring to its seat on the can cap flange 40. The block 38 is carried by pins 42 fast in a plate 43 guided on a stem 44 screwed into a cross piece 45 traversing the passage 35 near what constitutes the lower end thereof. The stem 44 also carries a washer or plate 46 between which and the plate 43 there is confined a cushion block 47 which may be made of elastic rubber, so that on an appropriate force being applied to the block 38 in a manner to be described the pins 42 and plate 43 will be forced along the stem 44 toward the plate or washer 46 compressing the rubber block 47. The table 1 carries another standard 48, which together with the standard 6 serves to support guides 49 for a slide 50, which in turn is provided with a bracket 51 carrying a follower to be described. Reciprocatory motion is imparted to the slide 50 by means of a crank shaft 52 and a pitman 53.

The follower carried by the bracket 51 is shown in detail in Figs. 3 to 6 and comprises a cylindrical block 54 having an axial bore 55 entering the block from one end, while the other end of the block is provided with an axial extension 56 in which there is a contracted extension 57 of the bore 55. The block 54 is also provided at the end having the extension 56 with a circumferential flange 58. Extending axially through the stem 57 is a bolt or rod 59 having a head 60 at one end, and at the other end screwed into a neck 61 provided at one end with a laterally expanded head 62 of an outer diameter approximately that of the block 54. The rod 59 within the passage 57 is surrounded by a helical spring 63 tending at all times to force the head 62 away from the block 54 until the movement is arrested by the head 60 on the bolt or rod 59. The head 62 is axially counter-sunk as indicated at 64, and the counter-sunk portion has an axial extension 65 entering the stem 61 and a further axial extension 66 also entering the stem 61 beyond the extension 65. Entering the counter-sink 64 is an auxiliary follower 67 also provided with an axial counter-sink 68 in the active face and with a neck 69 extending into the counter-sink extension 65. The countersink 68 receives the head of a screw 70 extending axially through the countersink extension 66 and entering the neck 61, and this screw 70 is surrounded by a helical spring 71 confined within the extension 66 and tending to force the auxiliary follower 67 outward from the countersink 64, but the movement of the head 67 under the action of the spring 71 is limited by the head of the screw 70. The active faces of the auxiliary follower 67 and the head 62 conform to the shape of what may be termed the inner face of the can cap, while the marginal portion of the head 62 is formed with a groove 72 for a purpose which will presently appear. Surrounding the block 54 is a sleeve 73 held to the block by screws 74 traversing the flange 58, and between the flange 58 and the opposing end of the sleeve 73 are springs 75 about the respective screws 74. That end of the ring 73 remote from the screws 74 is formed with an axially extended flange 76 of an internal diameter to receive the head 62 and an external diameter to enter the expanded portion of the passage 35, while between the flange 76 and the body of the sleeve 73 there is formed a shoulder 77 adapted to engage what constitutes the upper edge of the annulus 33.

Let it be assumed that it is desirable to provide can caps with solder hems in accordance with the present invention. There is first produced a tube of solder of appropriate length, which length may be as great as the exigencies of manufacture and handling permit, and the diameter of this tube is substantially that of the solder rings 41. The solder tube is fed downwardly through the rollers 9 and 8 until its lower end, the tube being substantially vertical in the machine, is coincident with the cutting edge of the knife or blade 30. There is imparted a rapid rotative movement to the shaft 15 and this causes a like rapid movement of revolution of the knife 30, the speed in practice approaching one thousand revolutions per minute for the knife. The parts are so timed in operation that the feeding devices for the solder tube are quiet while the knife is active, and while the solder tube is standing still the rapidly revolving knife has imparted thereto a movement toward the axis of the tube 10 in such relation to the speed of revolution of the knife that the latter will whirl several times about the tube of solder while approaching the axis thereof a distance equal to the thickness of the wall of the tube 10. The cutting edge of the knife, therefore, follows a spiral path of slowly decreasing radius, so that the cutting edge of the knife will displace the metal of the tube in the form of a thin flat ring, that is, a ring of even thickness throughout, although the ring may be slightly dished due to the action of the bevel 32 upon the severed portion of the tube ultimately resulting in a solder ring 41. The dishing, however, is very slight. The movement of the knife toward the axis of the tube 10 is such that the upper surface 31 of the knife at no time presses against the freshly cut end of the tube 10 and consequently there is no compacting of the metal of the tube 10, while there is no compacting of the severed ring since such ring moves freely away from the knife as it is being cut off from the tube, there being nothing to prevent such movement. The knife as has been already described, has a progressional movement toward the axis of the tube 10 imparted to it by the lever 29 and connections therefrom to the knife carrying lever 22 by means fully disclosed in the aforesaid Letters Patent.

The severing of the thin solder ring from the tube is accomplished without the expenditure of any of the metal of the tube other than that included in the solder ring itself, for the rapidly revolving knife acts on the metal of the tube to force that portion of the metal constituting the ring away from the main body of the tube without, however, exerting any longitudinal pressure on the tube itself, while the action of the cutting edge of the blade on the metal of the tube is that of a shear cut of extremely sharp angle, the blade revolving six to ten times while moving toward the axis of the tube 10 while in engagement with said tube for a distance of about one-eighth of an inch. The several solder rings are of a diameter somewhat greater than that of the can cap to which they are to be applied and have a thickness of about seventeen-thousandths of an inch, or even less, and consequently are very delicate and are very easily distorted. For this reason the solder rings cannot be handled but must be deposited at once at the point of utilization, that is, each upon the upturned marginal flange of the can cap to be hemmed.

In accordance with the present invention the solder rings as produced receive no intermediate manipulation or treatment, nor are they subjected to the action of any mechanism, but move solely by gravity to the position where they are to be subsequently treated for permanent application to the can caps. Each solder ring is, therefore, severed from the solder tube in a position immediately over an inverted can cap, so that as the solder ring leaves the solder tube it falls through a short air space directly into the expanded portion 36 of the passage 35 and by the curvature of this expanded portion the solder ring is directed to and centered upon the then upturned marginal flange of the can cap resting on the block 38. As soon as the solder ring is deposited upon the can cap the dial plate 2 is turned an appropriate distance until the can cap with the solder ring resting thereon is brought beneath the die designed to fold the solder ring about the margin of the can cap in embracing relation thereto. The parts are so timed in action that the die block 54 is moved downwardly, the position of the parts being such that the block 38 is then immediately below the die block 54, and the supplemental head 67 is the first part of the follower to engage the can cap then resting on the block 38 thereunder. The continued downward movement of the follower causes a compression of the spring 71, thus clamping the cap 39 to the block 38 with commensurate force, the head 67 retreating into the countersunk 64, while the spring 71 is compressed. The head 62 next engages the can cap already clamped to the block 68 by the supplemental follower head 67, while the walls of the groove 72 engage the inner edge portion of the ring 41 holding it down upon the concave face of the flange 40. This position of the parts is shown in Fig. 4.

The cushion 47 is sufficiently stiff to overcome the resistance of the spring 71 and is also sufficiently stiff to overcome the resistance of the spring 63, so that as the follower still continues to descend the head 62 approaches the corresponding end of the block 54 and the neck 61 retreats into the passage or recess 55 until ultimately the lower edge of the block 54 engages the head 62. But, meanwhile the flange 76 has entered the expanded portion 36 of the passage 35, and has extended into the portion 37 of the expanded portion of this passage, the flange 76 during this movement engaging the outer portion of the ring 41 outside the marginal flange 40 of the can cap, thereby bending the solder ring into a substantially cylindrical form, the engaging edge of the flange 76 being appropriately rounded to prevent injury to the delicate ring 41. This position of the parts is shown in Fig. 5. The downward movement of the sleeve 73 is arrested by engagement of the shoulder 77 with the corresponding portion of the annulus 33 and further downward movement of the follower causes a compression of the springs 75, wherefore all portions of the follower except the sleeve 73 continue the downward movement, thus compressing the cushion 47, so that the block 38 also participates in the downward movement and travels in the passage 35 of the annulus 33 until ultimately the already partially folded outer edge of the ring 41 engages the incurved wall of the portion 37, thus directing the corresponding portion of the ring 41 against the convex face of the flange 40 and the solder ring is thereby folded about the margin of the can cap in engagement with both faces of the flange 40. The final movement of the parts just described is shown in Fig. 6.

By the present process there is economically and expeditiously applied to a can cap a hem of solder in the form of a ring folded about the edge of the marginal flange of the cap, which latter may be of standard form commonly used in the trade, or of any other appropriate form, while the quantity of solder employed is reduced to the lowest practical minimum, thereby effecting a very material saving in cost, while the solder hem is applied to the cap with no waste whatsoever in the formation of the solder rings and requiring no remelting of unused solder with attendant losses as has heretofore been the case where the solder is cut into rings from sheets of solder.

In order to satisfy the demands of the trade the solder must be uniformly distributed about the cap to produce the required joint when the cap is finally sealed in place on the can top. To do this, and at the same time employ no more solder than is requisite for the securing of the cap, the amount of solder applied to the cap must be a minimum, but by the methods heretofore employed a much larger quantity of solder than is necessary for the purpose of sealing must be employed with attendant increase in cost.

By the present process the amount of solder initially applied to the cap is far less than has heretofore been found to be necessary, but because of the characteristics of solder it became necessary to treat the material in a different manner than heretofore in order to obtain the solder in the condition whereby the minimum quantity may be utilized and applied to the can cap in the form of a hem ready for the melting and sealing operation commonly known as soldering, the ordinary process of soldering where the solder is applied to the can cap after the latter is placed upon the can top and is there melted by appropriately applied heat, being very wasteful of solder, and also failing to produce so neat appearing a finish as is possible when the can cap is prepared in accordance with the present invention. The conditions to be met required first the initial preparation of the solder in the form of a tube, then the cutting from the tube of flat rings of extreme thinness and without distortion or any projections interfering with the proper seating of the ring on the can cap, and finally the securing of so delicate a ring to the can cap. The cutting of a wafer-like ring from a solder tube also presented problems due to the character of the material to be treated. Solder such as used for the purpose is a ductile material, and is very easily distorted. Because of the extreme thinness of the solder rings to be produced no interior support for the tube is possible and pressure sufficient to distort the solder tube or the rings cut therefrom is prohibited. It, therefore, became necessary to employ high surface speed for the cutting tool with comparatively gradual but constant feed, and, furthermore, the cut ring must be forced away from the tube from which it is cut without the knife or cutter exerting any pressure toward the freshly cut surface at the end of the tube, for such pressure would tend to upset the end of the tube, thereby interfering with the succeeding cut. Moreover, the great delicacy of so thin a solder ring as is provided by the present invention precludes any mechanical or manual handling of the ring between the cutting operation and those operations which result in the folding of the delicate solder ring about the edge of the can cap. For this reason the solder tube is supported in an upright position with the end from which the rings are cut downward, wherefore each cut ring will gravitate on to a can cap positioned immediately underneath the lower end of the solder tube from which position the can cap with the solder ring resting thereon may be moved to another position where by a single progressive stroke of a plunger the delicate solder ring is folded about the edge of the can cap upon which it rests and against opposite faces of the can cap adjacent the edge, thereby becoming fixed to the can cap in a manner permitting subsequent handling without damage, the material of the can cap acting as a backing for the delicate solder ring and the folding of the latter about the edge of the can cap stiffening the solder ring to the requisite extent. The solder is uniformly distributed about the edge of the can cap to a substantially equal extent on both faces of the marginal portion of the can cap, and while but a minimum quantity of solder is employed, which quantity is far less than that heretofore necessary, the solder on being melted in the soldering operation is found to be ample to unite the can cap to the can top and absolutely seal the joint.

What is claimed is:—

1. The process of hemming can caps with solder hems, which consists in providing tubes of solder with the outer and inner diameters of the tube respectively greater and less than the diameter of the can caps, shearing wafer-like rings of substantially even thickness throughout from the solder tube and allowing them to freely drop therefrom upon the marginal portions of the can caps, and then folding the rings as dropped thereon about the margins of the can caps.

2. The process of hemming can caps with solder hems, which consists in providing solder in tubular form with the outer and inner diameters of the tube respectively greater and lesser than the diameter of the can caps, mounting the tube with one end free and unsupported, shearing off from the end of the solder tube while there free and unsupported wafer-like rings of substantially even thickness throughout, causing the rings as severed from the tube to gravitate upon the can caps, and then folding the solder rings about the marginal portions of the can caps.

3. The process of hemming can caps with solder, which consists in providing solder in tubular form with the outer and inner diameters of the tube respectively greater and lesser than the diameter of the can caps, placing the solder tube in a substantially upright position, shearing off wafer-like rings of substantially uniform diameter throughout from the then lower end of the tube and permitting the severed rings to gravitate on to the can caps, and folding the rings about the margins of the can caps.

4. The process of hemming can caps with solder, which consists in providing solder in tubular form with the outer and inner diameters of the tube respectively greater and lesser than the diameter of the can caps, placing the tube of solder in a substantially upright position, placing a can cap in the inverted position beneath the solder tube, shearing off a wafer-like ring of solder of substantially uniform thickness throughout from the then lower end of the solder tube and causing it to gravitate on to the upturned margin of the can cap, and then folding the deposited solder ring about the marginal portion of the can cap.

5. The process of hemming can caps with solder, which consists in providing solder in tubular form, placing the solder tube in a substantially upright position, placing a circular can cap in the inverted position beneath the solder tube, shearing off a wafer-like ring of substantially uniform thickness from the then lower end of the solder tube, and causing the ring to gravitate upon the marginal portion of the can cap in substantially concentric relation thereto, and folding the solder ring about the marginal portion of the can cap.

6. The process of hemming can caps with solder, which consists in providing solder in tubular form, placing the solder tube in a substantially upright position, severing a wafer-like ring of solder from the then lower end of the tube by forcing a thin section of the metal at the terminal portion of the tube in a direction substantially axial of the tube, and applying the force progressively in a direction toward the axis of the tube until the ring is separated from the end of the tube, permitting the severed ring to gravitate upon a can cap, and then folding the ring about the marginal portion of the can cap.

7. The process of applying solder hems to can caps, which consists in establishing a solder tube with its longitudinal axis substantially upright, positioning an inverted can cap with its center below and in substantial alinement with the longitudinal axis of the solder tube, shearing off from the then lower edge of the solder tube a wafer-like ring of solder of substantially equal thickness throughout and allowing such ring to gravitate to and rest upon the margin of the can cap substantially concentric with the center of said can cap, and then folding the deposited ring about the marginal portion of the can cap.

8. The process of applying solder hems to can caps, which consists in providing a tube of solder and positioning it with its longitudinal axis substantially upright, severing wafer-like rings of substantially even thickness throughout from the then lower end of the solder tube, causing the deposition of such rings as severed upon respective can caps, and then folding each solder ring about the marginal portion of the respective can cap.

9. The process of applying solder hems to can caps each of which latter is provided with a curved marginal flange, consisting in providing a tube of solder and placing the tube with its longitudinal axis substantially upright, placing the can caps in succession and in the inverted position beneath the then lower end of the solder tube, severing waferlike rings of solder from the then lower end of the solder tube, causing the severed rings to be deposited successively upon the upturned edges of the respective can caps by gravity in centered relation to the caps, and folding the rings about the marginal portions of the can caps into engagement with the opposite faces of the marginal flanges.

10. The process of hemming can caps with solder, which consists in providing a tube of solder and placing the tube in a substantially upright position, placing the can cap to be hemmed beneath the tube, severing a wafer-like ring of solder from the then lower end of the tube by a progressive axial and diametric displacement of the metal of the tube at a distance from the lower end of the tube corresponding to the thickness of the ring to be severed, causing the ring to gravitate upon the can cap in centralized relation thereto, and then folding the deposited ring about the marginal portion of the can cap.

11. The process of hemming can caps with solder, which consists in providing solder in tubular form and placing the tube in a substantially upright position, severing wafer-like rings of solder from the then lower end of the solder tube by a combined axial and radial displacement of the metal at a distance from the lower end of the tube corresponding to the thickness of the ring to be severed, causing the severed ring to drop from the tube upon the can cap in centralized relation thereto, and folding the deposited ring about the marginal portion of the can cap in engagement with the respective faces thereof.

12. The process of producing can caps with solder hems consisting in first providing solder in tubular form and can caps with marginal flanges, the solder tube having its outer and inner diameters respectively greater and lesser than the diameter of the can caps to be hemmed, separating wafer-like rings of solder from the lower end of the positioned solder tube by displacing the metal of the tube progressively from the outer wall toward the inner wall and also away from the lower end of the tube, causing the rings so formed to gravitate in succession upon the upturned margins of the can caps in centralized relation to said can caps, and then folding the rings about the marginal portions of the can caps and into egagement with the opposite faces thereof.

13. The process of providing can caps with solder hems, which consists in shearing wafer-like rings of substantially even thickness throughout from a solder tube having its outer and inner diameters, respectively, greater and less than the diameter of the can caps, allowing the rings so formed to gravitate directly upon the can caps, and then folding the rings so deposited about the marginal portions of the can caps.

14. The process of providing can caps with solder hems, which consists in shearing substantially flat wafer-like rings of substantially even thickness throughout from the end of a solder tube of greater external diameter and less internal diameter than the diameter of a can cap, while said end of the solder tube is free and unsupported, allowing the rings so formed to gravitate freely and directly upon the can caps while the latter are inverted, and then folding the rings so deposited about the marginal portions of the can caps.

15. In the process of providing can caps with solder hems, shearing wafer-like and substantially flat rings of substantially even thickness throughout from the end of a solder tube of greater external and less internal diameter than that of the can caps, while said end of the solder tube is free and unsupported, and allowing the rings so formed to gravitate freely and directly upon the can caps to be hemmed.

16. In the process of providing can caps with solder hems, shearing wafer-like and substantially flat rings of substantially even thickness throughout from the lower and then free and unsupported end of a substantially upright solder tube of greater external and less internal diameter than that of the can cap to be hemmed, and allowing the ring so formed to freely and directly gravitate from the tube from which it is sheared to the can cap while the latter is inverted and into position with respect to the can cap whereby the can cap receives the ring intermediate of the inner and outer edges of the latter.

In testimony, that I claim the foregoing as my own, I have hereto affixed my signature in the presence of two witnesses.

WALTER J. PHELPS.

Witnesses:
 JOHN H. SIGGERS,
 E. G. SIGGERS.

Copies of this patent may be obtained for five cents each, by addressing the "Commissioner of Patents, Washington, D. C."